United States Patent
Nelson et al.

(10) Patent No.: US 6,884,965 B2
(45) Date of Patent: Apr. 26, 2005

(54) FLEXIBLE HEATER DEVICE

(75) Inventors: James P. Nelson, Naperville, IL (US); Tilak R. Varma, Grayslake, IL (US); Michael Starozhitsky, Buffalo Grove, IL (US); Paul J. Storiz, Grayslake, IL (US); Edward Bulgajewski, Genoa, IL (US)

(73) Assignee: Illinois Tool Works Inc., Glenview, IL (US)

( * ) Notice: Subject to any disclaimer, the term of this patent is extended or adjusted under 35 U.S.C. 154(b) by 87 days.

(21) Appl. No.: 10/243,578

(22) Filed: Sep. 13, 2002

(65) Prior Publication Data

US 2003/0102296 A1 Jun. 5, 2003

Related U.S. Application Data

(63) Continuation-in-part of application No. 09/889,843, filed as application No. PCT/US00/01702 on Jan. 24, 2000.
(60) Provisional application No. 60/117,144, filed on Jan. 25, 1999.

(51) Int. Cl.[7] .................................................. H05B 1/00
(52) U.S. Cl. ....................... 219/217; 219/212; 219/528; 219/529; 219/543; 219/549; 338/306
(58) Field of Search ................................. 219/217, 203, 219/211, 212, 219, 528, 529, 543, 549; 392/425, 432, 435; 338/306, 307, 308, 309, 314; 297/DIG. 5

(56) References Cited

U.S. PATENT DOCUMENTS

| | | | |
|---|---|---|---|
| 3,877,788 A | 4/1975 | Sprague et al. | 356/124 |
| 4,032,752 A | 6/1977 | Ohmura et al. | 219/541 |
| 4,399,347 A | 8/1983 | Schmitt | 219/203 |
| 4,436,986 A | 3/1984 | Carlson | 219/505 |
| 4,665,304 A | 5/1987 | Spencer | 219/219 |

(Continued)

Primary Examiner—Fadi H. Dahbour
(74) Attorney, Agent, or Firm—Mark W. Croll; Paul F. Donovan

(57) ABSTRACT

The heating device includes a conductive layer which is positioned on an electrically insulative substrate. Preferably, the conductive layer is screen printed onto the substrate. The substrate is designed to limit elongation of the conductive layer, thereby improving the durability of the conductor and enabling the heating device to be used in flexible applications, such as automobile seats. The substrate can include at least one aperture passing therethough to further improve flexibility, fatigue resistance, and breathability of the heater. The conductive layer is configured to include a buss structure with a first buss ground inwardly adjacent from the periphery of the heating device and a first buss with serpentine paths extending from one edge of the heating device to another edge. The buss structure further includes a second buss with L-shaped portions positioned between the serpentine paths and the first buss ground. The second buss ground is located in a central location between the serpentine paths. A resistive or thermistor layer, preferably with a resistance which increases materially in response to increased temperature, is placed over the conductive layer.

30 Claims, 3 Drawing Sheets

U.S. PATENT DOCUMENTS

| | | | |
|---|---|---|---|
| 4,713,531 A * | 12/1987 | Fennekels et al. .......... 219/212 |
| 4,761,541 A | 8/1988 | Batliwalla et al. .......... 219/528 |
| 4,845,343 A | 7/1989 | Aune et al. .................. 219/545 |
| 4,857,711 A | 8/1989 | Watts ......................... 219/548 |
| 4,868,898 A * | 9/1989 | Seto ........................... 219/528 |
| 5,034,594 A * | 7/1991 | Beezhold et al. ........... 219/528 |
| 5,081,339 A | 1/1992 | Stine .......................... 219/217 |
| 5,111,025 A | 5/1992 | Barma et al. ............... 219/217 |
| 5,197,595 A | 3/1993 | Coultas ...................... 206/0.6 |
| 5,206,482 A | 4/1993 | Smuckler .................... 219/219 |
| 5,405,178 A * | 4/1995 | Weingartner et al. .. 297/DIG. 5 |
| 5,422,462 A | 6/1995 | Kishimoto .................. 219/545 |
| 5,451,747 A | 9/1995 | Sullivan et al. ............. 219/528 |
| 5,851,588 A | 12/1996 | Andresen .................... 427/228 |
| 5,643,480 A | 7/1997 | Gustavsson et al. ........ 219/211 |
| 5,679,277 A | 10/1997 | Niibe et al. ................. 219/543 |
| 5,801,914 A | 9/1998 | Thrash ........................ 361/104 |
| 5,824,996 A | 10/1998 | Kochman et al. ........... 219/529 |
| 5,861,610 A | 1/1999 | Weiss ......................... 219/497 |
| 5,961,869 A | 10/1999 | Irgens ......................... 219/549 |
| 6,031,214 A | 2/2000 | Bost et al. .................. 219/545 |
| 6,054,690 A | 4/2000 | Petit et al. ................... 219/528 |
| 6,084,217 A | 7/2000 | Bulgajewski ............... 219/505 |
| 6,093,910 A * | 7/2000 | McClintock et al. ....... 219/217 |
| 6,097,009 A | 8/2000 | Cole ........................... 219/528 |
| 6,111,234 A | 8/2000 | Batliwalla et al. .......... 219/549 |
| 6,124,577 A | 9/2000 | Fristedt ...................... 219/497 |
| 6,143,206 A | 11/2000 | Handa et al. ................ 252/500 |
| 6,150,642 A | 11/2000 | Weiss et al. ................ 219/528 |
| 6,172,344 B1 | 1/2001 | Gordon et al. .............. 219/529 |
| 6,189,487 B1 * | 2/2001 | Owen et al. ................ 219/219 |
| 6,194,687 B1 * | 2/2001 | Joseph et al. ............... 219/217 |
| 6,215,111 B1 | 4/2001 | Rock et al. .................. 219/545 |
| 6,220,659 B1 * | 4/2001 | McDowell et al. ......... 219/217 |
| 6,229,123 B1 | 5/2001 | Kochman et al. ........... 219/549 |
| 6,307,188 B1 | 10/2001 | Bulgajewski ............... 219/505 |
| 6,353,207 B1 * | 3/2002 | Burt ........................... 219/217 |
| 6,426,485 B1 | 7/2002 | Bulgajewski et al. ....... 219/219 |
| 6,455,823 B1 | 9/2002 | Bulgajewski et al. ....... 219/548 |
| 6,495,809 B1 | 12/2002 | Bulgajewski et al. ....... 219/548 |
| 6,559,422 B1 * | 5/2003 | Burt ........................... 219/217 |

\* cited by examiner

US 6,884,965 B2

FLEXIBLE HEATER DEVICE

CROSS-REFFERENCE TO RELATED APPLICATIONS

This application is a continuation-in-part of U.S. application Ser. No. 09/889,843 filed Jul. 22, 2002 entitled "Self-Regulating Flexible Heater", which is a 371 of PCT/US00/01702 field Jan. 24, 2000, which claims priority from U.S. provisional application Ser. No. 60/117,144 filed on Jan. 25, 1999. The disclosure of these prior applications are incorporated herein by reference.

FIELD OF THE INVENTION

The present invention relates to heating systems which are suitable for use in automobile components but which may also be used in other applications. In particular, this invention relates to a heating device with a dielectric substrate having a conductor material and a resistive layer screen printed thereon.

BACKGROUND OF THE INVENTION

Heating devices with temperature regulating properties are used in the automotive industry. However, some automotive applications, such as self-regulating heaters for external mirrors, do not require flexibility. Such heaters can be found in U.S. Pat. No. 4,931,627 and U.S. Pat. No. 4,857,711, both commonly owned with the present application.

The parent applications of the present application have provided a flexible heater which has been very satisfactory when flexibility is required, for example, in an automotive application, such as an automotive seat. However, further refinements are desired to allow the material of the heater to better flex without any degradation in performance, particularly regarding heating capacity and uniformity of heating. Further refinements are desired to provide a protective layer to protect against contact with liquid spills. Similarly, still further refinements are desired in providing improved stress relief, flexibility and ventilation.

SUMMARY OF THE INVENTION

It is therefore a feature of the present invention to provide a heating device, particularly for seating applications for the automotive industry, which provides increased flexibility and fatigue resistance without compromising performance.

It is therefore a further feature of the present invention to provide a heating device, particularly for seating applications for the automotive industry, which maintains its capability and uniformity of heating through the lifetime of the product.

It is therefore a further feature of the present invention to provide a heating device, particularly for seating applications for the automotive industry, which maintains its performance after repeated flexing.

It is therefore a still further feature of the present invention to provide a hearing device, particularly for seating applications for the automotive industry, which maintains its performance after being exposed to liquid spills.

It is therefore a still further feature of the present invention to provide a heating device, particularly for seating applications for the automotive industry, which provide different heating levels with simplified control.

It is therefore a still further feature of the present invention to provide a heating device, particularly for seating applications for the automotive industry, which provides for reduced stresses when flexed or even stretched.

It is therefore a still further feature of the present invention to provide a heating device, particularly for seating applications for the automotive industry, which provide for improved ventilation.

These and other features are attained by providing a flexible heater which includes an electrically insulative substrate to which a conductor material is screen printed (or otherwise attached, such as by adhesive). The substrate increases the fatigue life of the conductor by being made of a material which has a high modulus of elasticity thereby limiting elongation of the conductor material, as well as providing a protective layer from liquid spills for the conductor material. The substrate also advantageously isolates the heater.

After the conductor is positioned onto the substrate, a resistive element can be applied over the conductor. In one embodiment, the resistive element is made of a PTC (positive temperature coefficient) material, that is, a material whose resistance generally increases in response to an increase in temperature, thereby typically resulting in a self-regulating heating device. Alternately, the resistive element can be a fixed resistive element which uses a controller to regulate the heating level. In either case, the resistance element is typically a polymer thick film, but may be of other suitable material.

In one embodiment of the invention, the heater circuit includes a conductor layer having a main buss, a main buss ground, a small buss, a third buss, and a third buss ground, as well as a thermistor layer. The third buss includes a serpentine configuration to provide uniform heating. By changing the polarity connections of the busses, different heating levels can be provided. This simplifies the external electronic controller to little more than a simple multi-pole switch.

In yet another embodiment of the invention, apertures can be provided through the heater assembly to improve the flexibility and fatigue resistance of the heater assembly. The apertures provide a reduction in the amount of stress applied to the assembly, particularly the conductor material, when the assembly is caused to flex. Moreover, the apertures beneficially allow air to flow through the assembly.

Other features and advantages of the invention will become apparent to those skilled in the art upon review of the following detailed description, claims and drawings, in which like numerals are used to designate like features.

Figure 1B:
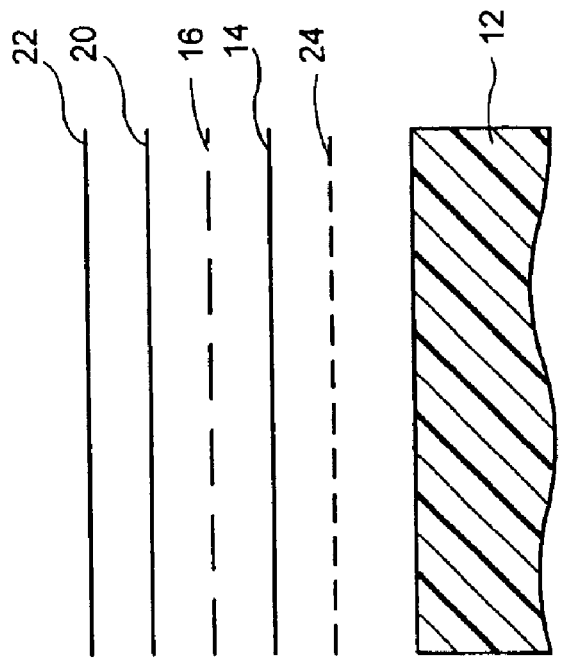
FIG. 1b is a cross-sectional schematic illustrating an alternative sequence of layers in a heating device according to the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENTS

Figure 2:
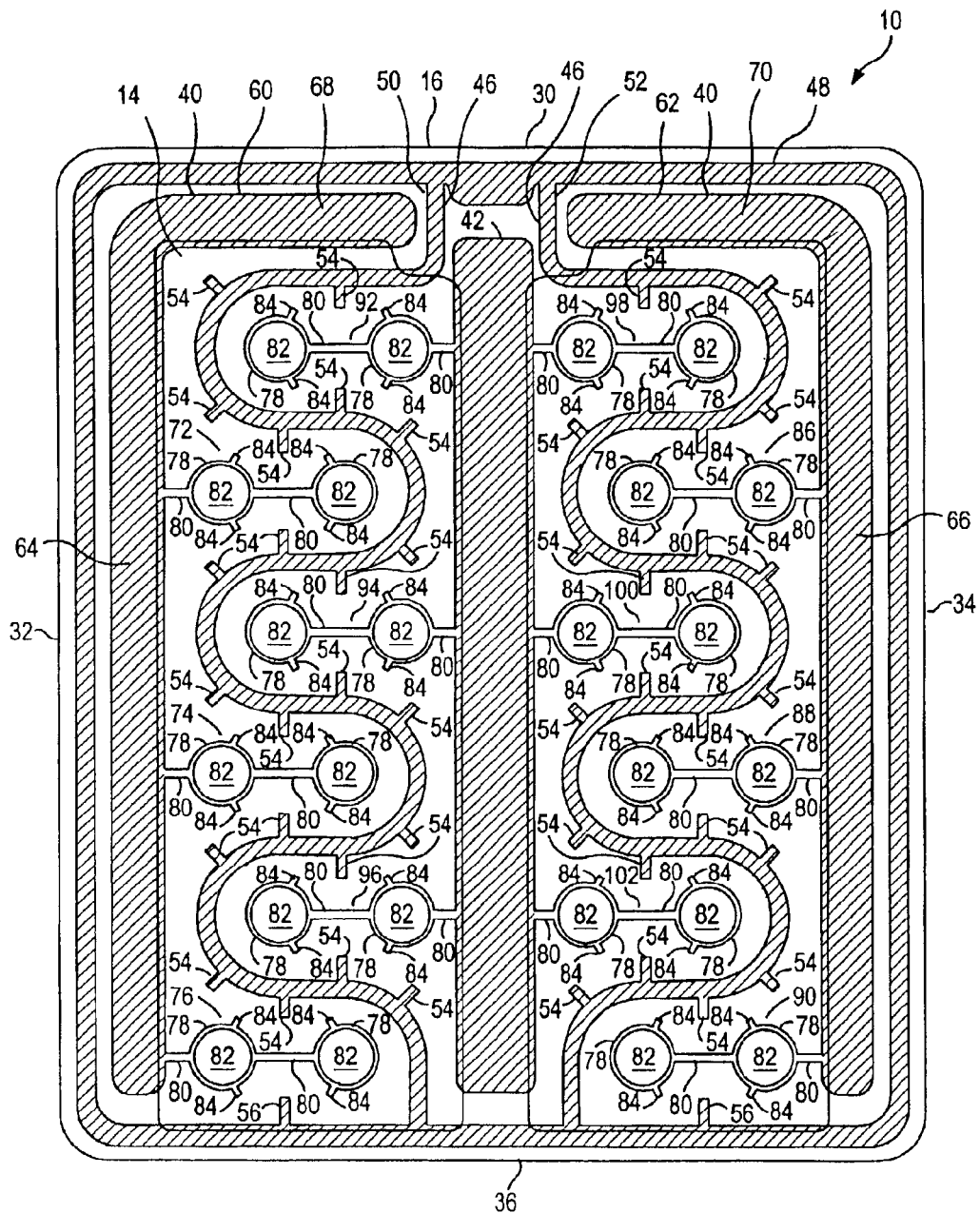
FIG. 2 is a schematic of a buss structure of one embodiment of the present invention.
Figure 3:
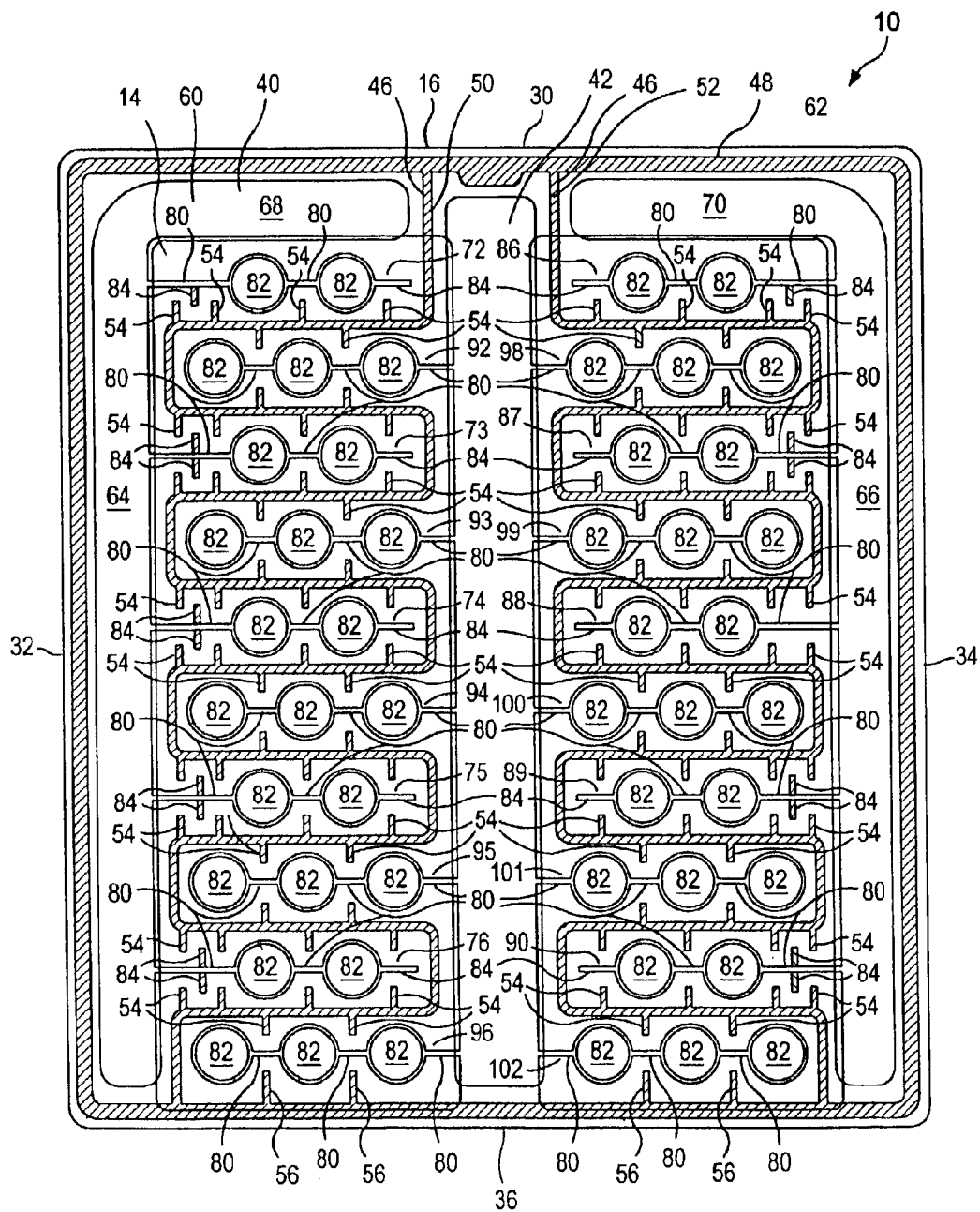
FIG. 3 is a schematic of a buss structure of yet another embodiment of the present invention.

Referring now to the drawings in detail, FIGS. 2–3 show the typical outline of a heating device 10 of the present invention, particularly when used for a heater for an automotive seat or a similar application. Similar applications include, but are not limited to, off-road vehicles, marine applications, and the like.

Figure 1A:
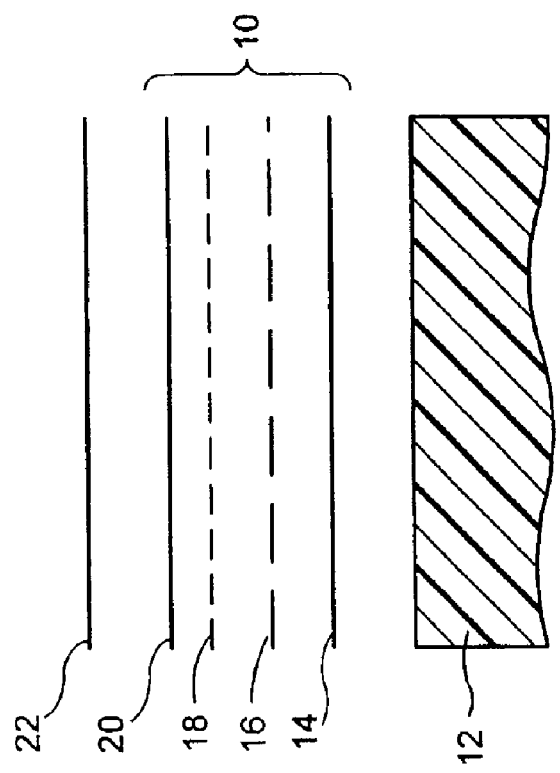
FIG. 1a is a cross-sectional schematic illustrating the sequence of layers in a heating device according to the present invention.

FIG. 1a shows the sequence of layers of a heating device 10 according to one embodiment of the invention. Conductor layer 16, which includes various busses such as shown in FIGS. 2–3, is screen printed onto a substrate 20. The substrate 20 is made of an electrically insulative material, such as a polyester film or Mylar, but can be made of any suitable material according to the principles of the present invention. For example, the substrate can be made of various polymer films and other dielectric materials. Moreover, the substrate is configured to be thin enough to allow for heat to pass therethrough, but thick enough to provide the mechanical properties consistent with the teachings of the present invention. If the conductor layer 16 is not screen printed onto the substrate 20 (e.g., it can be printed onto thermistor layer 14), an adhesive layer 18 is generally needed. The adhesive is made from any number of suitable materials and applied in any suitable manner known in the art. Conductor layer 16 is typically made from a conductive metal such as copper, silver, gold, aluminum, carbon, or graphitic materials, and may also be an inherently conductive polymer such as polyaniline or polypryrrole. However, those skilled in the art will recognize a range of equivalent substitutions of materials upon study of this disclosure. In general, the conductive material is made of very small flakes of material in a polymer matrix. If this material is caused to be over stretched or subjected to repeated stretching causing fatigue, the conductive layer may actually crack, thereby resulting in undesirable arching. Therefore, according to the present invention, the substrate 20 is adapted to protect and prevent the conductor layer 16 from being damaged in applications where a flexible heater is desired.

A resistive or thermistor layer 14 is applied on to the conductor layer 16. The resistive layer 14 can be a PTC material to provide a self-regulating heater or can be a fixed resistance element which requires an electronic controller (not shown) to regulate the heat level. The resistive layer 14 is typically a polymer thick film. The resulting heating device 10 may be placed between the seating upholstery fabric 22 and the internal foam rubber material 12 of the automotive seat. The heater may be laminated with foam to facilitate incorporation into a seat. Although not shown, an adhesive layer and a fabric layer may be positioned between the resistive layer 14 and foam material 12. FIG. 1b does, however, illustrate an adhesive layer 24. The adhesive can be made of any suitable material, but a pressure sensitive adhesive is particularly suitable for use in accordance with the principles of the present invention. The adhesive and fabric can be applied in any suitable manner, such as by lamination. The fabric may be advantageously made of a flame retardant material. The fabric may also advantageously be a noise isolator, bulk stabilizer, and thermal insulator for the heater assembly. The density of the fabric may range from 1 to 10 ounces per square yard, but could be of other suitable densities. The flame retardant material may be based on halogen/antimony, melamine, phosphorous or inorganic flame retardant chemistry.

According to one embodiment of the present invention, a dielectric film can be applied over the conductor by heat lamination. The film improves the chemical resistance and durability of heating device 10. The heating device 10 thereby achieves improved resistance to chemicals such as plasticizers and solvents that can be found in automotive seats of some manufacturers. The laminate further protects the surface of the heating device 10 by preventing the silver and carbon black of the conductors from being removed by contact and abrasion with the fabric or other seat members. The adhesive laminate can further help to reduce or eliminate cracking of conductor layer 16, thereby extending the life of conductor layer 16 and that of heating device 10. For instance, polyester film with a polyester adhesive may be used. However, other types of films such as nylon, polyolefine and polyimide can be used, as well as other types of adhesives such as epoxy and acrylics, or even types of adhesive that are pressure sensitive rather than those requiring heat activation.

Referring now to FIG. 2, one sees a first embodiment of the configuration of the conductor layer 16 and the resistive layer 14. One further sees that heating device 10 typically includes upper edge 30, side edges 32, 34 and lower edge 36. Conductor layer 16 is formed so as to create main buss 40, main buss ground 42, third buss 46, and third buss ground 48. In addition, several small busses extend from main buss 40 and main buss ground 42 as will be described hereinafter. In the embodiment of FIG. 2, third buss ground 48 is formed inwardly adjacent from a periphery of the heating device 10 as formed by upper edge 30, side edges 32, 34 and lower edge 36. Third buss 46 is formed from two serpentine paths 50, 52 which, in turn, are formed from successive inwardly and outwardly facing curved portions. Serpentine paths 50, 52 extend from a portion of the third buss ground 48 which is inwardly adjacent from upper edge 30 to a portion of third buss ground 48 which is inwardly adjacent from lower edge 36. Serpentine path 50 is positioned generally about one fourth of the vertical distance from side edge 32 to side edge 34 while serpentine path 52 is positioned generally about three fourths of the vertical distance from the side edge 32 to side edge 34. In order to increase the uniformity of heating, serpentine paths 50, 52 include spurs 54 which extend into resistive layer 14. Similarly, the portion of third buss ground 48 which is inwardly adjacent from lower edge 36 includes spurs 56. Main buss 40 is formed from inverted (in the orientation shown in FIG. 2) L-shaped portions 60, 62 with longer legs 64, 66 inwardly adjacent from side edges 32, 34, respectively, and shorter legs 68, 70 colinear with each other and inwardly adjacent from upper edge 30. Longer leg 64 includes small busses 72, 74, 76 which extend inwardly into resistive layer 14 and into the outwardly facing curved portions of serpentine path 50. Small busses 72, 74, 76 include round portions 78 joined by, and therefore in electrical communication with, straight portions 80. Round portions 78 encircle apertures 82 which typically pass through all layers of heating device 10 thereby improving ventilation and heat circulation and further providing stress relief and increased flexibility. Round portions 78 further include spurs 84 which extend into resistive layer 14 to increase the uniformity of heating. Similarly, longer leg 66 includes small busses 86, 88, 90 which extend into resistive layer 14 and into the outwardly facing curved portions of serpentine path 52. Small busses 86, 88, 90 include round portions 78 joined by, and therefore in electrical communication with, straight portions 80.

Main buss ground 42 extends through a central portion of heating device 10, positioned between serpentine paths 50, 52. Main buss ground 42 further includes small busses 92, 94, 96 which extend into the inwardly curved portions of serpentine path 50 and small busses 98, 100, 102 which extend into the inwardly facing curved portions of serpentine path 52. Small busses 92–102 include the previously identified structure of round portions 78 encircling apertures 82. Round portions 78 are in electrical communication with main buss ground 42 by straight portions 80 and further include spurs 84 to increase the uniformity of heating.

The resulting structure provides for low and high settings with a simple multi-pole switch (not shown) and further, as a resistive device, is not polarity sensitive.

In order to achieve a high setting for relatively greater heating, both L-shaped portions 60, 62 of main buss 40 and main buss ground 42 are connected to a positive battery polarity while third buss 46, in electrical communication with third buss ground 48, is connected to a negative battery terminal. Current flows from the two serpentine paths 50, 52 of third buss 46, through resistive layer 14 thereby producing heat, to the main ground buss 42 and to inverted L-shaped portions 60, 62 of main buss 40. As previously described, the various spurs and small busses aid in the uniformity of the distribution of the current through resistive layer thereby achieving more even heating.

In order to achieve a low setting for relatively lesser heating, both L-shaped portions 60, 62 of main buss 40 are connected to a positive battery polarity and main buss ground 42 is connected to a negative battery polarity. Current flows from the main buss ground 42 (including small busses 92–102), through the resistive layer 14, thereby producing heat, to main buss 40 (including small busses 72, 74, 76, 86, 88, 90).

Other setting combinations are also possible such as medium, medium high and medium low, depending upon the connection of the circuit.

It is important to note that the third buss ground 48 allows even distribution of current flow through the entire heater circuit. This is important in seat heater or similar designs due to the large size of the circuit. If the third buss ground 48 were not used in the circuit, the cumulative electrical resistance in the serpentine third buss 40 would choke off current flow toward the end of the circuit. It is common electrical design practice to decrease electrical resistance by increasing conductor width such as in the third buss 40. However, this would limit design freedom, possibly to the point of making the design impractical. The third buss ground 48 allows the third buss 40 to be kept at a reduced width thereby achieving a practical and even heating design.

FIG. 3 shows a similar design with numerals corresponding to those of FIG. 2. FIG. 3 shows a design with more tightly spaced inwardly and outwardly facing loops of the serpentine paths 50, 52, resulting in additional small busses 73, 75, 87, 89, 93, 95, 99, 101.

Thus the several aforementioned features and advantages are most effectively attained. Although preferred embodiments of the invention have been disclosed and described in detail herein, variations and modifications of the foregoing are within the scope of the present invention. It is understood that the invention disclosed and defined herein extends to all alternative combinations of two or more of the individual features mentioned or evident from the text and/or drawings.

All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A heating device for producing heat when connected to an electrical power source, including:
    an electrically insulative substrate positioned beneath a flexible member, wherein said substrate is made of a polymeric film;
    a conductive layer screen primed on said substrate in a pattern thereby forming a buss structure, wherein said substrate is adapted to limit elongation of said conductive layer when said substrate is subjected to a flexing action so as to improve durability of the conductive layer; and
    a resistive layer applied to said conductive layer, such that when an electrical power source is connected to said buss structure of the heating device, heat is generated.

2. The heating device of claim 1, wherein said substrate is a dielectric film substrate.

3. The heating device of claim 1, wherein paid resistive layer has en increasing resistance in response to an increasing temperature, thereby resulting in a self-regulating temperature characteristic.

4. The beating device of claim 1, wherein said substrate includes apertures formed therethrough.

5. The heating device of claim 1, further comprising a flame retardant material.

6. The heating device of claim 1, wherein the heating device is a seat heater for an automobile.

7. A beating device for producing heat when connected to an electrical power source, including:
    an electrically insulative substrate having at least one void extending therethrough;
    a conductive layer screen printed on said substrate in a pattern thereby forming a buss structure; and
    a resistive layer applied to said conductive layer, such that when an electrical power source is connected to said buss structure of the heating device, heat is generated.

8. The hosting device of claim 7, wherein said substrate is a dielectric film substrate.

9. The heating device of claim 7, wherein said resistive layer has an increasing resistance in response to an increasing temperature, thereby resulting in a self-regulating temperature characteristic.

10. The heating device of claim 7, further comprising a flame retardant material.

11. The beating device of claim 7, wherein the heating device is a seat heater for an automobile.

12. A heating device for producing heat when connected to an electrical power source, including:
    a substrate;
    a layer of resistive material;
    a layer of conductive material forming a buss structure for providing electrical current to said layer of resistive material; and
    said buss structure including a first buss ground which extends around a periphery of the heating device: a first buss in electrical communication with said first buss ground, including at least two serpentine paths extending through an area bounded by said first buss ground; a second buss ground positioned between said at least two serpentine paths; and a second buss located between said first buss ground and said at least two serpentine paths.

13. The heating device of claim 12, wherein said at least two serpentine paths include alternating inwardly facing curved portions and outwardly facing curved portions.

14. The heating device of claim 13, wherein said second buss ground includes second buss ground extensions which extend into said inwardly facing curved portions of said at least two serpentine paths.

15. The heading device of claim 14, wherein said second buss includes second buss extensions which extend into said outwardly facing curved portions of said at least two serpentine paths.

16. The heating device of claim 15, wherein said second buss ground extensions and said second buss extensions have circular portions defining apertures therein which pass through the heating device.

17. The heating device of claim 16, wherein said second buss includes a lust L-shaped portion comprises a first shorter leg and a first longer leg and a second L-shaped portion comprising a second shorter leg and a second longer leg.

18. The heating device of claim 17, wherein said first shorter leg said second shorter leg are colinear along a first edge of the heating device, a space being formed between said first shorter leg and said second shorter leg through which said at least two serpentine paths extend.

19. The heating device of claim 18, wherein said first longer leg extends along a second edge of the heating device and said second longer leg extends along a third edge of the heating device, wherein said first longer leg is parallel to said second longer leg.

20. The bearing device of claim 19, wherein said first longer leg and said second longer leg are perpendicular to said first shorter leg and said second shorter leg.

21. The heating device of claim 20, wherein said second buss ground is parallel to said first longer leg and said second longer leg.

22. The heating device of claim 21, wherein said at least two serpentine paths include spur portions.

23. The heating device of claim 22, wherein said second buss ground extensions include spur portions.

24. The heating device of claim 23, wherein said second buss extensions include spur portions.

25. The heating device of claim 12, wherein resistance of said resistive layer increases with increasing temperature thereby providing a self-regulating temperature characteristic.

26. The heating device of claim 12, wherein said substrate is dielectric.

27. The heating device of claim 26, wherein said conductive layer is screen printed over said substrate.

28. The heating device of claim 27, wherein said conductive layer is formed from a material chosen from the group consisting of copper, gold, silver, aluminum, carbon, graphitic materials and a conductive polymer.

29. A method of assembling a heating device for use in an automobile seat, the method comprising the steps of:

providing an electrically insulative substrate made of a polymeric film;

screen printing a conductive layer onto the substrate, the substrate being adapted to limit elongation of the conductive layer;

applying a resistive layer onto the conductive layer, the conductive layer and resistive layer being adapted to generate heat when subjected to an electrical power source;

applying at least one of a fabric material, an adhesive, and a flame retardant material to either side of the substrate; and positioning the foregoing assembly between an outer seating material and an inner seating material.

30. A method of assembling a heating device for use in an automobile seat, the method comprising the steps of:

providing an electrically insulative substrate;

screen printing a conductive layer onto the substrate, the substrate being adapted to limit elongation of the conductive layer;

applying a resistive layer onto the conductive layer, the conductive layer and resistive layer being adapted to generate heat when subjected to an electrical power source;

applying at least one of a fabric material, an adhesive, and a flame retardant material to either side of the substrate; and positioning the foregoing assembly between an outer seating material and an inner seating material;

wherein the step of applying at least one of a fabric material, an adhesive, and a flame retardant material to either side of the substrate includes applying an adhesive over the resistive layer and applying a flame retardant fabric over the adhesive, and wherein the outer seating material is an upholstery fabric and the inner seating material is a foam rubber.

* * * * *